United States Patent
Kashima (10) Patent No.: US 6,321,720 B1
(45) Date of Patent: Nov. 27, 2001

(54) INTAKE SYSTEM FOR FOUR-CYCLE ENGINE POWERING AN OUTBOARD MOTOR

(75) Inventor: Yukinori Kashima, Shizuoka (JP)

(73) Assignee: Sanshin Kogyo Kabushiki Kaisha, Shizuoka (JP)

(*) Notice: Subject to any disclaimer, the term of this patent is extended or adjusted under 35 U.S.C. 154(b) by 0 days.

(21) Appl. No.: 09/442,123

(22) Filed: Nov. 16, 1999

(30) Foreign Application Priority Data

Nov. 16, 1998 (JP) .................................................. 10-324301
Nov. 20, 1998 (JP) .................................................. 10-330086
Nov. 20, 1998 (JP) .................................................. 10-330087

(51) Int. Cl.$^7$ .................................................. F02M 33/04
(52) U.S. Cl. .................................................. 123/470; 123/184.31
(58) Field of Search .................................................. 123/456, 468, 123/469, 470, 472, 432, 184.61, 184.37, 184.31

(56) References Cited

U.S. PATENT DOCUMENTS

| | | | |
|---|---|---|---|
| 4,922,876 | * 5/1990 | Mizoguchi et al. | 123/470 |
| 4,924,834 | * 5/1990 | Bonfiglioli et al. | 123/470 |
| 4,932,368 | * 6/1990 | Abe et al. | 123/470 |
| 4,966,120 | * 10/1990 | Itoh et al. | 123/470 |
| 5,074,269 | * 12/1991 | Herbon et al. | 123/456 |
| 5,101,792 | 4/1992 | Koch | 123/456 |
| 5,146,897 | * 9/1992 | Hattori | 123/470 |
| 5,156,124 | * 10/1992 | Sugimoto et al. | 123/432 |
| 5,167,211 | * 12/1992 | Fukuma et al. | 123/470 |
| 5,207,190 | 5/1993 | Torigai et al. | 123/73 A |
| 5,357,931 | * 10/1994 | Semence | 123/456 |

(List continued on next page.)

FOREIGN PATENT DOCUMENTS

0 423 813 A1  4/1991  (EP) .
0 45 234 A1  11/1991  (EP) .

Primary Examiner—Thomas N. Moulis
(74) Attorney, Agent, or Firm—Knobbe, Martens, Olson & Bear LLP.

(57) ABSTRACT

An engine includes an improved induction system which reduces the girth of the engine, simplifies assembly, and improves better power output balance between the cylinders of the engine. The illustrated engine is a multi-cylinder engine and is designed to power an outboard motor; hence, the cylinders of the engine are arranged above one another. Thus, the engine comprises at least first and second combustion chambers. The induction system selectively communicates with the combustion chambers to supply a fuel/air charge thereto. The induction system includes a first intake passage leading to the first combustion chamber and having a first fuel injector communicating therewith, and a second intake passage leading to the second combustion chamber and having a second fuel injector communicating therewith. The second intake passage descends from the second fuel injector toward the second combustion chamber by a greater degree than the first intake passage descends from the first fuel injector toward the first combustion chamber. Additionally, a length of the second intake passage from the second fuel injector to second combustion chamber is greater than a length of the first intake passage from the first fuel injector to the first combustion chamber. Both of these factors enhance the combustion efficiency of the lower cylinder to balance better the power outputs between the cylinders. Each fuel injector also is mounted to a throttle body which regulates air flow through the corresponding intake passage. In one mode, the fuel injector is mounted between the throttle device and the engine so as to reduce the girth of the engine. This arrangement also simplifies engine assembly.

50 Claims, 10 Drawing Sheets

U.S. PATENT DOCUMENTS

| | | | |
|---|---|---|---|
| 5,465,699 | * 11/1995 | Voigt | 123/470 |
| 5,489,227 | 2/1996 | Ishida et al. | 440/77 |
| 5,505,166 | 4/1996 | Katoh | 123/41.31 |
| 5,551,393 | 9/1996 | Armano et al. . | |
| 5,636,613 | 6/1997 | Aoyama et al. | 123/432 |
| 5,673,671 | * 10/1997 | Kato | 123/470 |
| 5,758,623 | * 6/1998 | Nitta et al. | 123/470 |
| 5,765,519 | 6/1998 | Watanabe . | |
| 5,769,060 | 6/1998 | Matsumoto . | |
| 5,894,831 | * 4/1999 | Takahashi et al. | 123/470 |
| 5,941,205 | 8/1999 | Hiraoka et al. . | |
| 6,039,029 | * 3/2000 | Nagasaka et al. | 123/470 |

* cited by examiner

INTAKE SYSTEM FOR FOUR-CYCLE ENGINE POWERING AN OUTBOARD MOTOR

PRIORITY INFORMATION

This application is based on and claims priority to Japanese Patent Application Nos. 10-324301, 10-330086, and 10-330087, filed Nov. 16, 1998, Nov. 20, 1998, and Nov. 20, 1998, respectively.

BACKGROUND OF THE INVENTION

1. Field of the Invention

The present invention relates to a four-cycle engine for powering an outboard motor, and in particular, relates to an induction system for such engine.

2. Description of the Related Art

Engines used to power outboard motors are typically water-cooled. The cooling water is usually drawn from the body of water in which the motor is operating through an inlet port in the lower unit of the outboard motor.

The cooling water is pumped from the lower unit to the power head, where it is circulated through various coolant passages formed in the cylinder blocks and cylinder heads to cool the engine. Because the cooling water is drawn from below the engine, it is typically circulated through the coolant passages from the bottom of the engine to the top of the engine. As a result, the bottom cylinders of the engine are generally cooler than the top cylinders.

Fuel tends not to mix with induction air as readily at lower temperatures. As a result, the combustion efficiency of the cooler bottom cylinders is generally lower than the top cylinders. This results in an unbalanced power output between the top and bottom cylinders of the engine.

Induction systems for outboard motors typically include an air intake chamber located within the motor cowling and intake pipes leading from the intake chamber to intake passages formed in the cylinder heads. A throttle valve is usually provided in the intake chamber for regulating the air flow through the intake pipes.

The manufacture and assembly of the intake chamber and intake pipes must be precise so that, during operation of the motor, external air does not leak into the induction system at the junctions between the intake chamber and intake pipes. Because the throttle is located upstream of the junctions between the intake chamber and intake pipes, external air leaking through the junctions can result in unstable engine output.

SUMMARY OF THE INVENTION

An aspect of the present invention involves an engine comprising at least first and second combustion chambers. The first combustion chamber is arranged above the second combustion chamber. An induction system selectively communicates with the combustion chambers to supply a fuel/air charge thereto, and includes a first intake passage that leads to the first combustion chamber. A first fuel injector communicates with the first intake passage. A second intake passage leads to the second combustion chamber, and a second fuel injector communicates with the second intake passage. A length of the second intake passage from the second fuel injector to second combustion chamber is greater than a length of the first intake passage from the first fuel injector to the first combustion chamber. Thus, it takes less time for the fuel injected from the first injector to reach the first combustion chamber as compared to the second fuel injector and second combustion. Because the temperature in the engine is higher at the top than at the bottom, the fuel more quickly vaporizes in the first intake passage. Thus, the diffusion rate per unit time is greater in the first (upper) intake passage than in the second (lower) intake passage. The greater length of the second passage, however, compensates for the slower diffusion rate associated with the second passage. As a result, the output powers of the cylinders better approximate each other, i.e., a smaller differential of the power outputs between the combustion chambers occurs.

Another aspect of the present invention involves an engine comprising at least first and second combustion chambers, wherein the first combustion chamber is arranged above the second combustion chamber. An induction system selectively communicates with the combustion chambers to supply a fuel/air charge thereto. The induction system includes a first intake passage leading to the first combustion chamber and having a first fuel injector communicating therewith, and a second intake passage leading to the second combustion chamber and having a second fuel injector communicating therewith. The second intake passage descends from the second fuel injector toward the second combustion chamber by a greater degree than the first intake passage descends from the first fuel injector toward the first combustion chamber. This orientation tends to produce differing degrees of swirl within each combustion chamber, with greater swirl in the fuel/air charge occurring in the second (lower) combustion chamber. The increased swirl enhances flame propagation within the combustion chamber, and thus, improves combustion efficiency. This arrangement therefore improves the combustion efficiency of the second (lower) combustion chamber vis-a-vis the first (upper) combustion chamber, to compensate for the differential in combustion efficiency that occurs between the combustion chambers due to the cooler operating temperature of the second (lower) combustion chamber.

In accordance with another aspect of the present invention, an engine includes an improved induction system to simplify the assembly of the engine and to reduce the girth of the engine. In one mode, the induction system, which selectively communicates with at least one combustion chamber of the engine, includes an air intake chamber, a throttle device, and a first intake passage that extends between the intake chamber and the throttle device. A second intake passage extends between the throttle device and the combustion chamber. A fuel injector communicates with the induction system upstream of the second intake passage. The fuel injector also can be mounted upstream of the second intake passage.

In another mode, the induction system includes a first intake passage that extends between the intake chamber and the throttle device, and the second intake passage that extends between the throttle body and the combustion chamber. The second intake passage has a curvilinear portion that transitions from a direction along a side of the engine to a direction leading into the combustion chamber. The fuel injector communicates with the induction system upstream of the curvilinear portion of the second intake passage. The fuel injector also can be mounted upstream of the curvilinear portion.

In an additional mode, a first intake passage of the induction system extends outwardly from the intake port of the combustion chamber and then curves back inwardly toward the engine. The first intake passage communicates with a second intake passage that extends along a side of the engine and communicates with the air intake chamber. The fuel injector communicates with the second intake passage and is oriented to spray toward the first intake passage. This arrangement reduces the girth of the engine.

In another mode, a first intake passage extends outwardly from the intake port of the combustion chamber and a second intake passage communicates with the first intake passage. The second intake passage is curved and extends inwardly along a side of the engine, and also communicates with the air intake chamber. A fuel injector communicates with the second intake passage and is oriented to spray toward the first intake passage. In this manner, the first and second intake passages define an induction path that leads from the air intake chamber, bows outwardly along the side of the engine, and then curves back toward the engine and around to communicate with the intake port. This shape can generally approximate the curved shape of a side of a protective cowling which surrounds the engine in an outboard motor application of the invention.

Further aspects, features, and advantages of the present engine will become apparent from the detail description of the preferred embodiments which follow.

BRIEF DESCRIPTION OF THE DRAWINGS

The above-mentioned and other features of the invention will now be described with reference to the drawings of preferred embodiments of a four-cycle engine. The illustrated embodiments of the engine are intended to illustrate, but not to limit, the invention. The drawings contain the following figures.

DETAILED DESCRIPTION OF PREFERRED EMBODIMENTS FO THE PRESENT INVENTION

Figure 1:
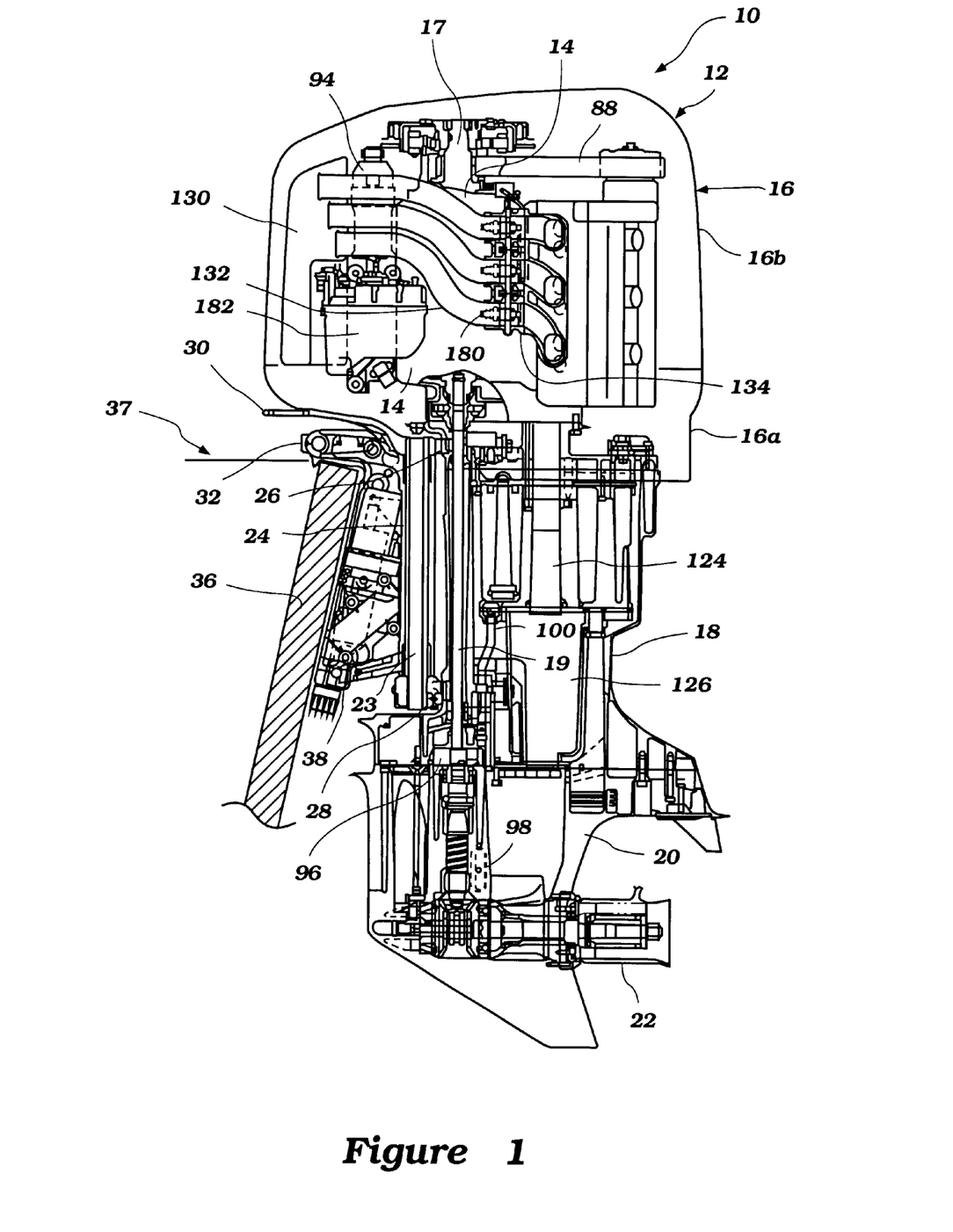
FIG. 1 is a sectional side elevational view showing an outboard motor configured in accordance with an embodiment of the invention, with some components thereof shown in a wire-frame format.

FIG. 1 illustrates an outboard motor 10 which incorporates an induction system configured in accordance with a preferred embodiment of the present invention. Although the induction system is described below in connection with the outboard motor, it should be understood that the invention may also be used in other applications.

The outboard motor 10 has a power head 12 which includes an internal combustion engine 14. A protective cowling assembly 16 surrounds the engine 14. The cowling assembly 16 includes a lower tray 16a and a main cowling member 16b.

As is typical with outboard motors, the engine 14 is supported within the power head 12 so that its output shaft 17 (i.e., a crankshaft) rotates about a vertical axis. The crankshaft 17 is coupled to a drive shaft 19 that depends through and is journaled within a drive shaft housing 18.

The drive shaft housing 18 extends downwardly from the cowling 16 and terminates in a lower unit 20. The drive shaft 19 extends into the lower unit 20 to drive a transmission housed within the lower unit 20. The transmission selectively establishes a driving condition of a propulsion device 22. In the illustrated embodiment, the propulsion device 22 is a propeller. The transmission desirably is a forward/neutral/reverse-type transmission so as to drive the watercraft in any of these operational states.

A swivel shaft 23 extends through a swivel bracket 24 and rotates about a generally vertical axis. The swivel bracket 24 is affixed to the drive shaft housing 18 by upper and lower brackets 26 and 28. Steering movement occurs about a generally vertical steering axis which extends through the swivel shaft 23. A steering arm 30 is connected to an upper end of the swivel shaft 23 and extends in a forward direction for steering of the outboard motor 10, as known in the art.

The swivel bracket 24 is also pivotally connected to a clamping bracket 32. The clamping bracket 32, in turn, is adapted to attach to a transom 36 of an associated watercraft 37. The clamping bracket 32 is arranged on the transom 36 at a location which supports the outboard motor 10 in a generally upright position and at a location where the blades of the propeller 22 lie at least partially beneath the surface of the body of water in which the watercraft 37 is operated.

The conventional coupling between the swivel bracket 24 and the clamping bracket 32 permits adjustment of the trim position of the outboard motor 10 and allows the outboard motor 10 to be tilted up for transportation or storage. For this purpose, a conventional tilt and trim cylinder assembly 38 desirably operates between the clamping bracket 32 and the swivel bracket 24. This permits the outboard motor 10 to move within a normal range of positions relative to the transom between a generally upright position to a full tilt-up position.

Figure 2:
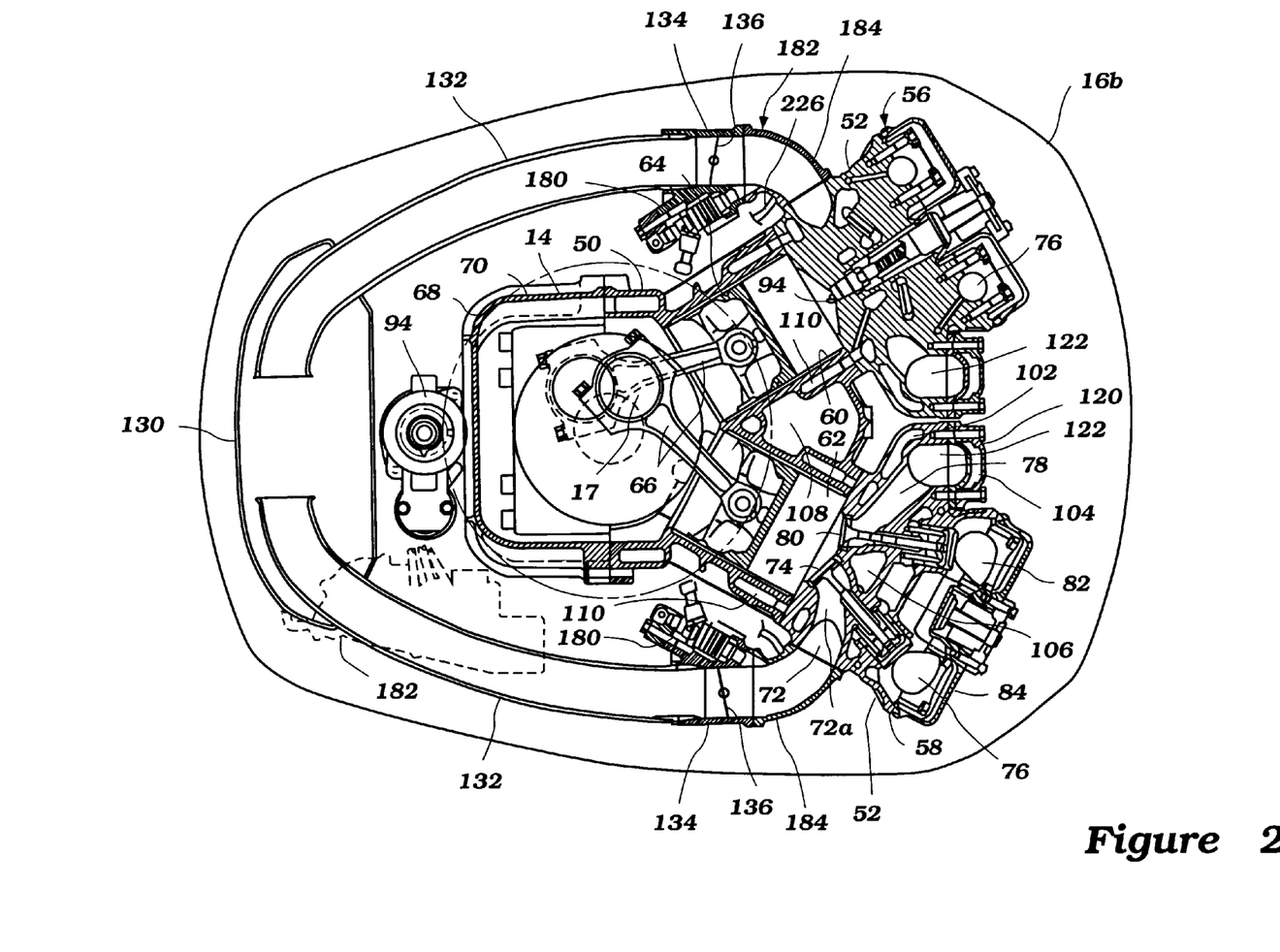
FIG. 2 is a cross-sectional top view of a power head of the outboard motor of FIG. 1.

With reference to FIG. 2, the engine 14 is preferably of the six-cylinder, four-cycle variety, and is arranged in a "V" fashion. In this arrangement, the engine 14 has a cylinder block 50 with cylinder heads 52 connected thereto and cooperating therewith to define first and second cylinder banks 56, 58. Each bank preferably defines three cylinders 60, each having a combustion chamber 62. As may be appreciated by those skilled in the art, the engine 14 may have a greater or lesser number of cylinders, such as two, four, eight or more. Aspects of the present invention can also be used with engines having other cylinder arrangements, e.g., in-line.

A piston 64 is movably positioned in each cylinder 60 and is adapted for reciprocating movement therein. The piston 64 is connected to a first end of a connecting rod 66. A second end of the rod 66 is rotatably connected to a throw of the crankshaft 17. The crankshaft 17 is journaled for rotation with respect to the cylinder block 50. A crankcase cover 68 engages an end of the block 50 generally opposite the heads 52 and with the block 50 defines a crankcase chamber 70 enclosing the crankshaft 17.

Intake passages 72 are formed in the cylinder head 52 for allowing air and fuel to enter the combustion chamber 62 through corresponding intake ports. In the illustrated embodiment, two intake ports are associated with each cylinder. An intake valve 74 is supported by the cylinder head 52 and is adapted to regulate the flow through each intake passage 72 and corresponding intake port. An intake valve camshaft 76 is journaled within the cylinder head 52 and actuates the intake valve 74 in a reciprocating manner, as is known in the art.

Exhaust passages 78 are also formed in the cylinder head 52 for allowing exhaust product to exit the combustion chamber 62 through corresponding exhaust ports. In the illustrated embodiment, two exhaust ports are associated with each cylinder. An exhaust valve 80 is supported by the cylinder head 52 and regulates flow through each exhaust passage 78 and exhaust port. An exhaust valve camshaft 82 is journaled within the cylinder head 52 and is adapted to actuate the exhaust valve 80 in a reciprocating manner similar to that of the intake valve 74 and intake camshaft 76. A cylinder head cover 84 fits over the cylinder head 52 and encloses the camshafts 76, 82.

Figure 3:
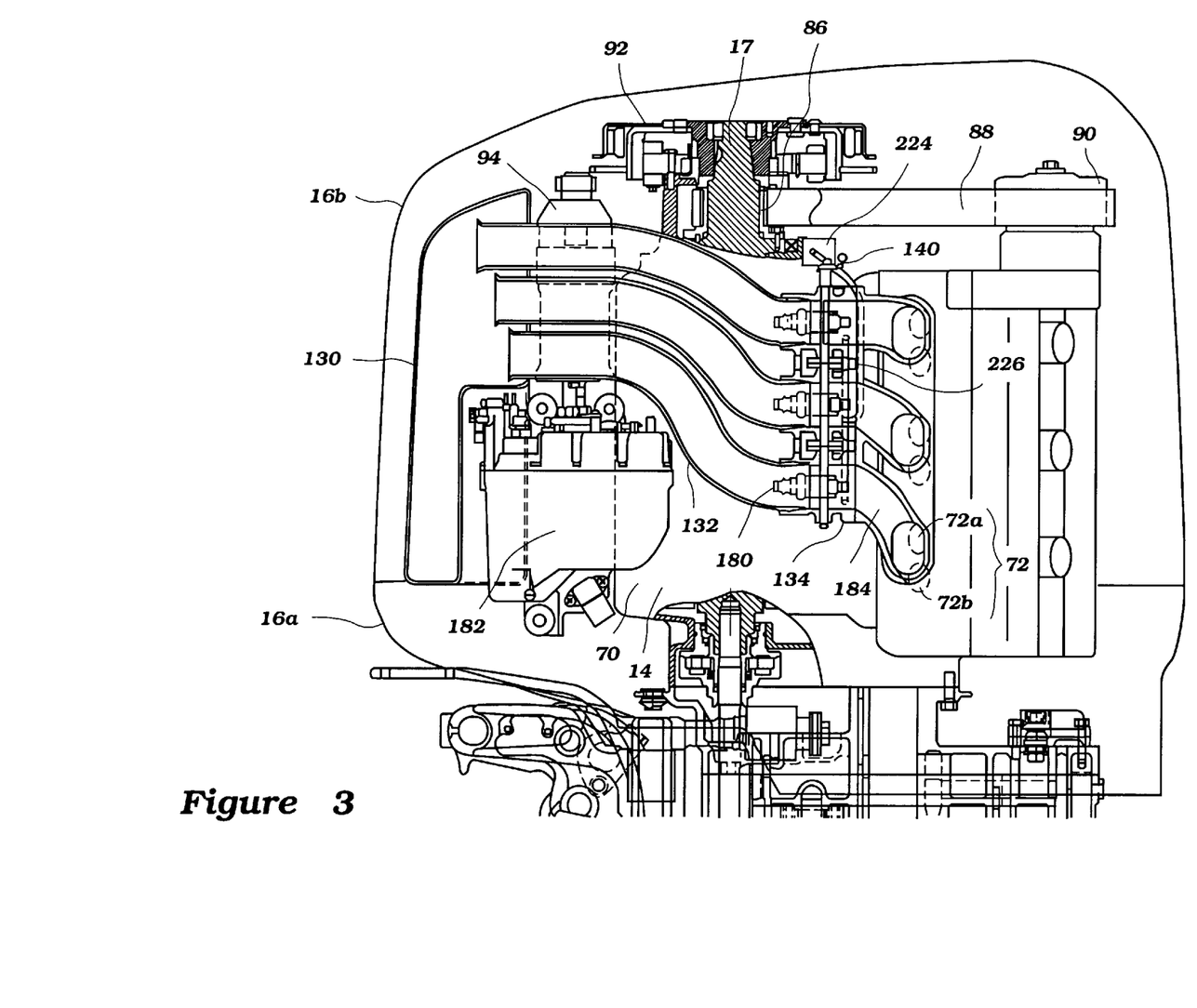
FIG. 3 is a sectional side view of the power head of FIG. 2.
Figure 4:
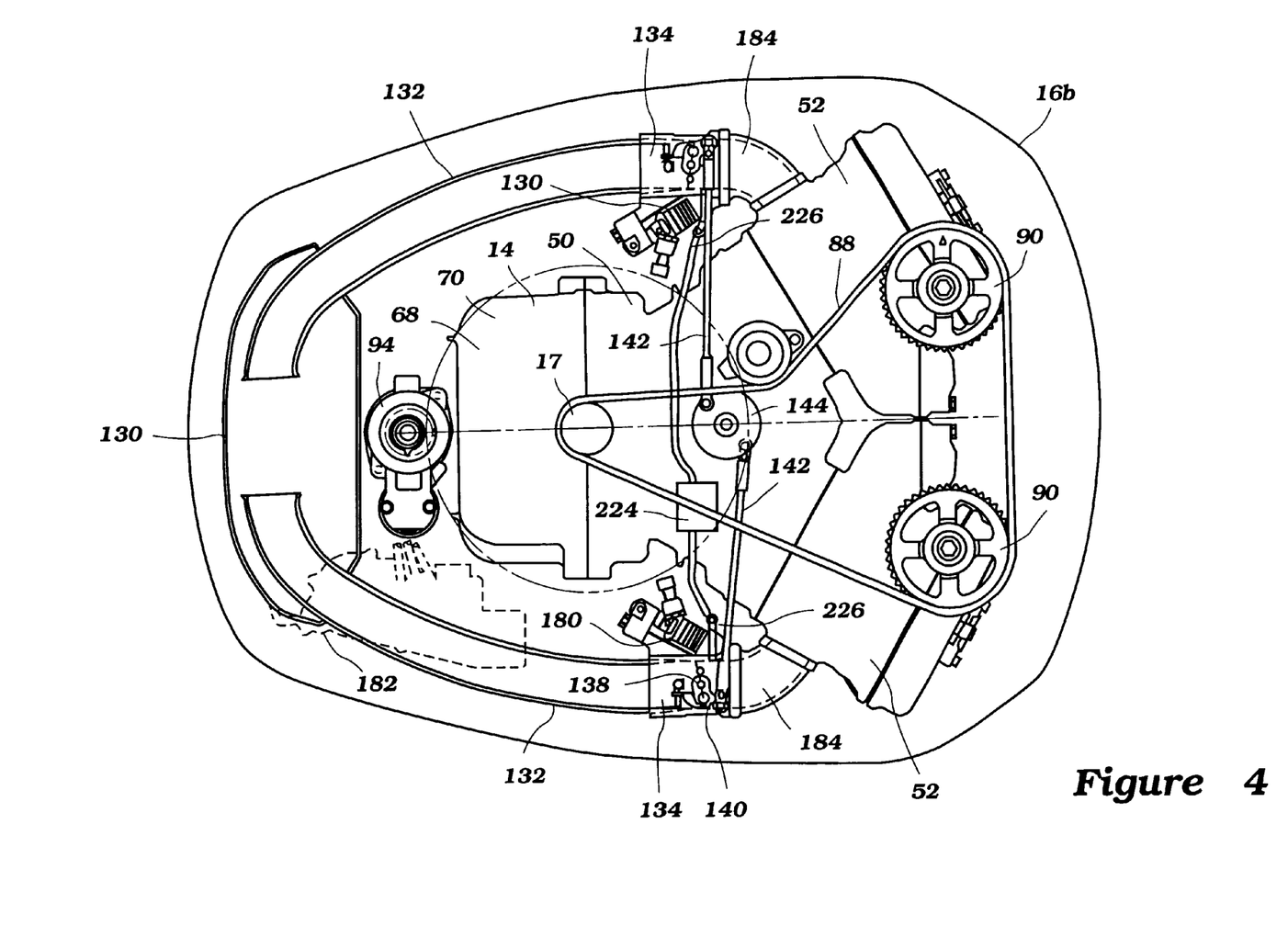
FIG. 4 is a top plan view of an engine of the power head of FIG. 2 with a protective cowling illustrated about the engine.

As illustrated in FIGS. 3 and 4, a drive pulley 86 is turned by the crankshaft 17. A timing belt 88 extends around the drive pulley 86 and turns a driven pulley 90 of each cylinder bank 56, 58. The driven pulley 90 drives both the intake and exhaust camshafts 76, 82 of the cylinder bank 56, 58 in any known manner.

A flywheel 92 is positioned above the crankshaft drive pulley 86 and is adapted to rotate with the crankshaft 17. A starter 94 is preferably positioned adjacent the crankcase to selectively engage the flywheel 92 for use in starting the engine 14, as is well known in the art. It is to be understood that although the flywheel 92 and the pulleys 86, 90 are illustrated as disposed at the top of the engine 14, these components can be appropriately rearranged. For example, the flywheel 92 and pulleys 86, 90 may be positioned at the bottom of the engine.

A suitable ignition system is provided for igniting an air and fuel mixture within each combustion chamber. Such ignition systems are well known in the art and may include a spark plug 94 extending into the combustion chamber.

Figure 5:
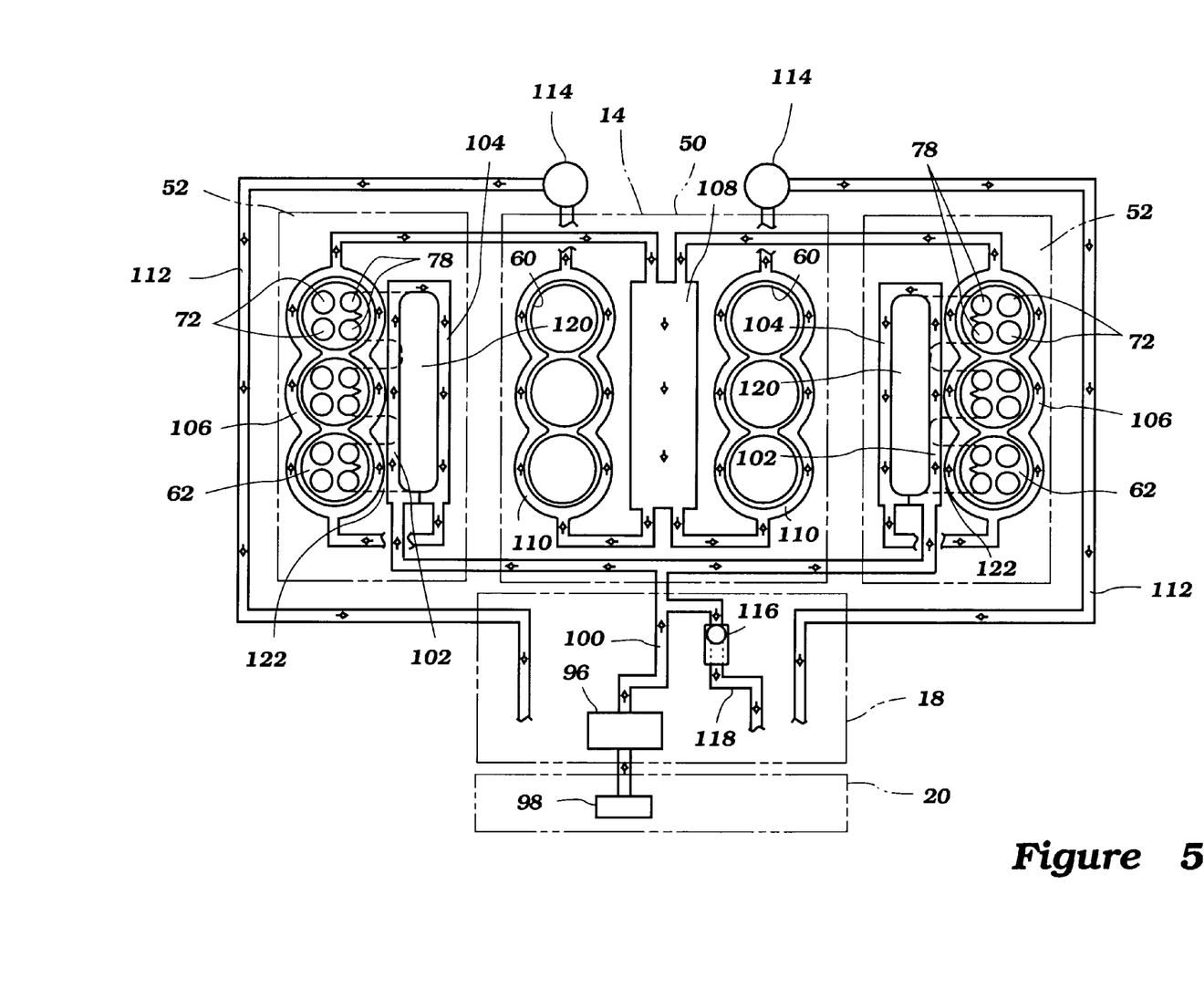
FIG. 5 is a diagram showing a flow of coolant through a cooling system employed in the outboard motor of FIG. 1.

With reference to FIGS. 1, 2 and 5, a cooling system is provided for cooling the engine. The drive shaft 19 drives a water pump 96 which preferably is disposed at the lower end of the drive shaft housing 18. The pump 96 draws water through an inlet port 98 in the lower unit 20. The water is delivered to the engine 14 through a coolant pipe 100 in the drive shaft housing.

The cooling water flows up into the engine 14 through a coolant passage 102 formed adjacent the exhaust passage 78 in each cylinder head 52. The water then follows a path down through a passage 104 in the exhaust manifold, up again through a second passage 106 in the cylinder head 52, and down through a v-bank jacket 108 formed between the cylinder banks 56, 58. From the V-bank jacket 108, the water flows up through a cylinder jacket 110 and down through an exit passage 112. Thus, the cooling water is circulated from the bottom to the top of the engine three times.

A thermostat 114 is preferably positioned near the end of the coolant path of each cylinder bank 56, 58 for monitoring the temperature of the coolant. A control valve (not shown) is also positioned in the coolant path of each cylinder bank 56, 58 and is controlled by the thermostat 114. If the coolant temperature is high, the valve is opened to allow coolant to flow through the engine at a high rate. On the other hand, if the temperature of the coolant is low, then the valve is closed, allowing the engine to warm up. Preferably, a relief valve 116 is provided near the pump 96 to divert coolant through a relief passage 118 in the event that the coolant pressure exceeds a predetermined high pressure.

With reference to FIGS. 1 and 2, an exhaust manifold 120 is mounted to each cylinder bank 56, 58. The exhaust manifold 120 and cylinder head 52 define a vertically extending exhaust passage 122. The exhaust passage 122 leads toward the bottom of the engine 14 and is connected to an exhaust pipe 124. The exhaust pipe 124 terminates within a chamber of a muffler 126. An exhaust gas outlet is provided in the bottom end of the muffler 126. The exhaust gas exits through the outlet and is routed through the propeller 22 to a point outside of the motor 10.

An induction system is provided for supplying air to the engine 14. The induction system includes an air intake chamber 130 positioned in the motor cowling 16 at the crankcase 70 or watercraft 37 side of the engine, as best illustrated in FIGS. 2 and 3. Air passes through a vent (not shown) in the motor cowling 16 and enters the intake chamber 130 through an air inlet (not shown) formed near the top of the intake chamber.

A plurality of intake pipes 132 lead from the intake chamber for directing air from the intake chamber to the engine 14. Preferably, one intake pipe 132 is provided for each cylinder 60. The intake pipes 132 extend around the body of the engine 14 along a path generally corresponding to a shape of the inside of the upper motor cowling 16a. As best seen in FIG. 2, each intake pipe 132 is curved or bowed and extends outwardly along a side of the engine 14.

The intake pipes 132 and the intake chamber 130 can be made of resin or of aluminum by a die-casting method. These components also can be integrally formed (i.e., formed as a unitary piece).

A throttle body 134 is connected to an end of each intake pipe 132 for communication with the intake pipe. A throttle device regulates flow through the throttle body 134. In the illustrated embodiment, a throttle valve 136 is adapted to rotate inside the throttle body 134 about a vertical axis to regulate a flow of air through the throttle body 134.

With reference again to FIG. 4, a mechanism is provided for actuating the throttle valves 136. Preferably, all of the throttle valves 136 of each cylinder bank 56, 58 are mounted for rotation on throttle shafts which are interconnected to rotate as a single shaft 138. A top end of the shaft 138 extends above the uppermost throttle body 134.

A lever 140 is attached to the top end of the shaft 138 for rotation therewith. The lever 140 is pivotally attached to an end of a rod 142 that extends toward the cylinder block 50. The rod 142 is pivotally attached at its other end to an outer edge of a rotary plate 144 mounted near the center of the cylinder block 50 so that, when the rotary plate is turned, all of the throttle valves 136 are actuated in unison.

Figure 6:
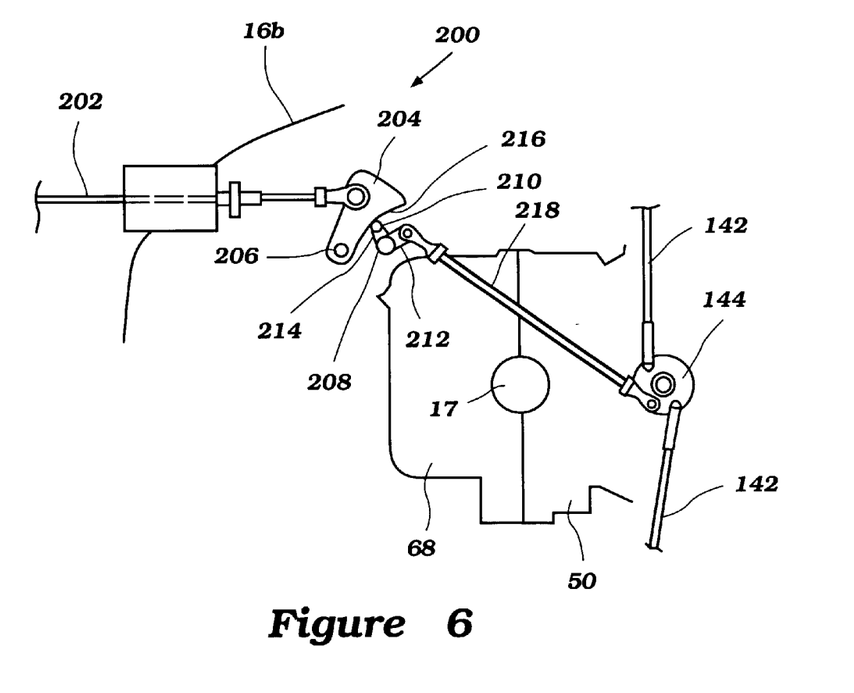
FIG. 6 is a top plan view of a throttle actuator mechanism employed in the outboard motor of FIG. 1.

FIG. 6 shows an actuation mechanism 200 for remotely actuating the throttle valves. A throttle cable 202, preferably a bowden-wire type cable, is used to link a remote actuator to the actuator mechanism 200. The throttle cable 202 includes a sleeve that is fixed relative to the upper cowling 16b of the motor 10. The throttle cable 202 is moved by an operator relative to the sleeve. The throttle cable 202 is connected to a cam lever 204 which pivots about a pivot point 206. A follower 208 is mounted next to the cam lever 204 and is biased to follow the movement of the cam lever 204. The follower 208 generally has an L-shape formed by a pair of arms 210, 212 that are disposed generally normal to each other. One arm 210 includes a roller 214 that cooperates with a cam surface 216 of the cam lever 204. The other arm 212 is pivotally connected to an end of a link rod 218. The link rod 218 connects the follower 208 to the rotary plate 144.

As understood from FIG. 6, axial movement of the throttle cable 202 causes the cam lever 204 to pivot about the pivot point. This movement is translated to the follower 208 which slides over the cam surface 216 of the cam lever 204. The follower 208 thus rotates to move the link rod 218. This movement in turn causes the rotary plate 144 to rotate and translate motion to the throttle shafts via the corresponding rods 142.

Figure 7:
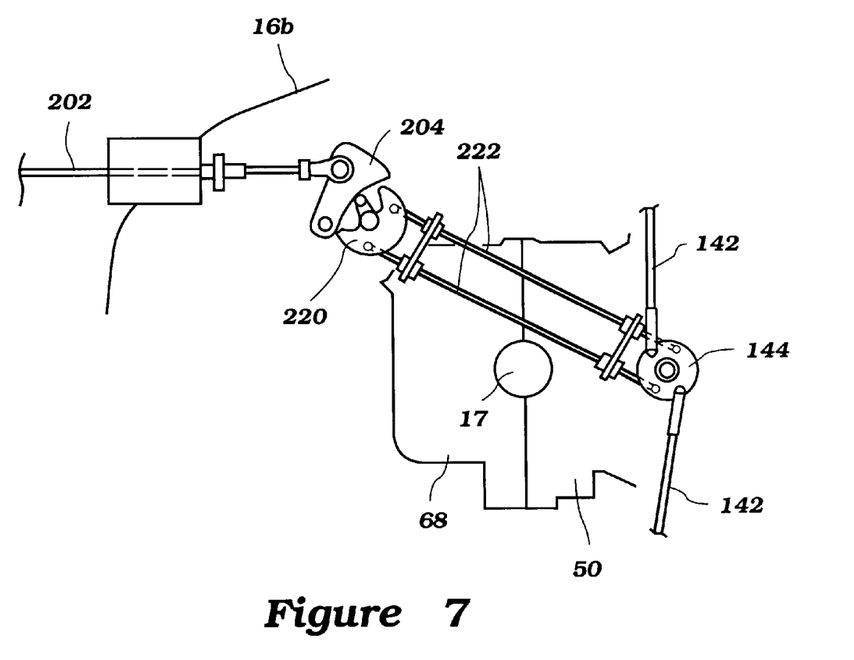
FIG. 7 is a top plan view of a variation of the throttle actuator mechanism of FIG. 6 which also can be employed with the outboard motor of FIG. 1.

FIG. 7 shows a variation of the actuation mechanism. Like components between the two variations of the actuator mechanism shown in FIGS. 6 and 7 have been assigned with the same reference numerals, and the above description of such like components should be understood to apply to the variation shown in FIG. 7. The principal difference between these two actuation mechanisms is the linkage between the follower 220 and the rotary disk 144. In this variation, a pair of wires 222 link the follower 220 and the rotary disk 144 together. These wires 222 are attached on either side of the rotary disk 144. The follower 220 has an appropriate shape to provide attachment of these wires 222 to the follower 220. Use of the dual wires 222 moves the follower 220 in both rotational directions.

The actuator mechanism also can be directly coupled to one of the throttle valve shafts 138. The driving force of the throttle cable is transmitted to the valve shaft 138 of the other cylinder bank through the rods 142 and the rotary disk 144.

An idle speed controller (ISC) 224 is located on the top of the engine body. The idle speed controller 224 communicates with each intake passage at a downstream side of the throttle device. In the illustrated embodiment, the idle speed controller 224 communicates with each throttle passage within the corresponding throttle body 134 just downstream of the throttle valve 136. Where the engine includes multiple cylinder banks, and hence, multiple sets of intake passages, the engine desirably includes an idle speed controller 224 for each set of intake passages, as best seen in FIG. 3. The idle speed controller communicates with each intake passage via one or more air delivery lines 226. During idle periods, air can be supplied to the throttle 134 bodies using only the idle speed controller 226. For this purpose, the idle speed controller includes a pump, (not shown) driven either by an electric motor or by the engine.

With reference to FIGS. 2 and 3, a fuel delivery system is provided for delivering fuel to each combustion chamber 62 for combustion therein. The fuel delivery system includes a plurality of fuel injectors 180, preferably one per cylinder, and a fuel pump (not shown) for delivering fuel to each fuel injector. A vapor separator 182 may also be provided for separating air from the fuel.

In the embodiment illustrated in FIG. 2, a fuel injector holder is formed integrally with each throttle body 134 on a side adjacent the engine body. The fuel injector 180 is held in place by the throttle body 134 so that its spray axis is generally parallel to an axis of the corresponding cylinder 60.

Figure 10:
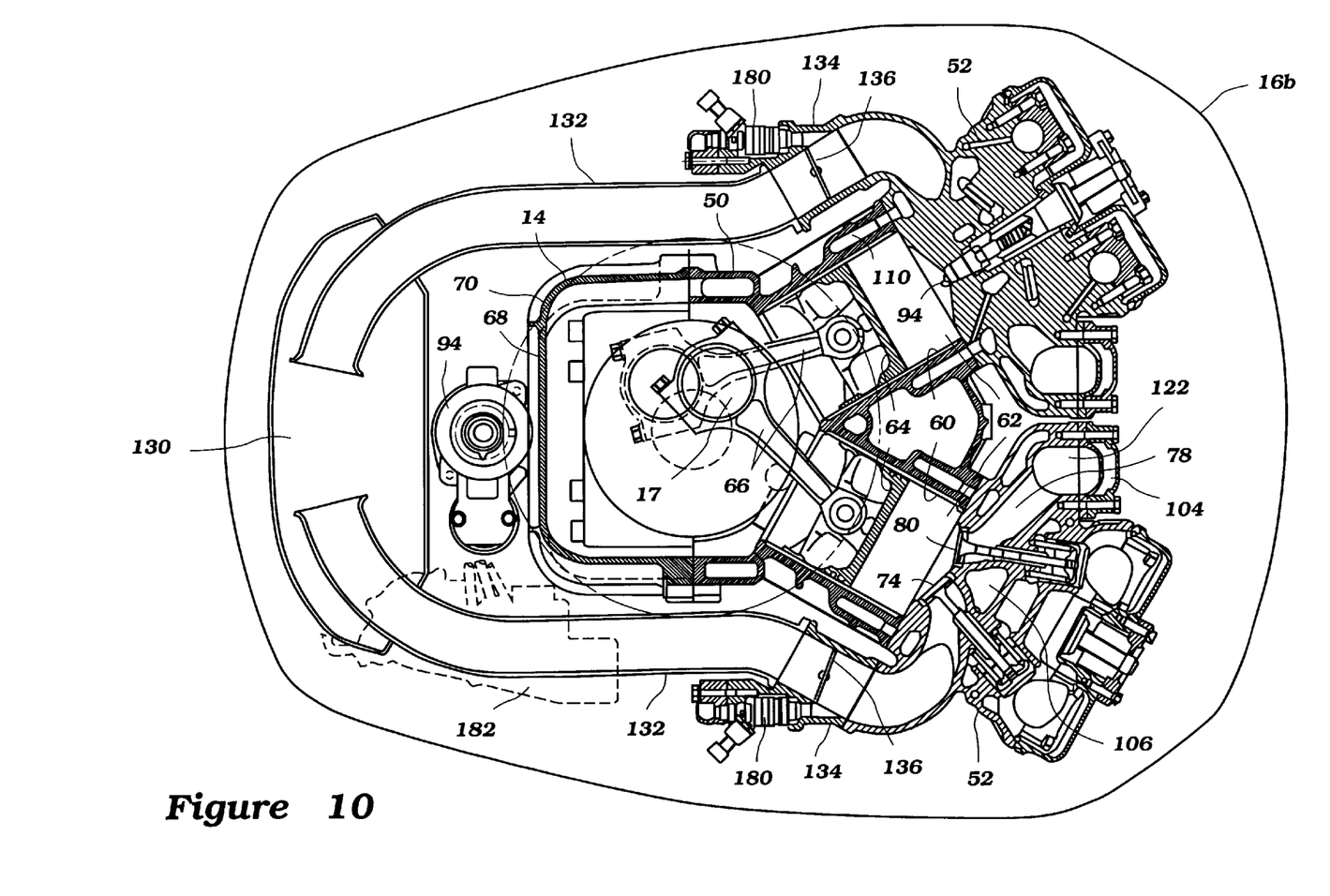
FIG. 10 is a cross-sectional top view of a power head for an outboard motor with an induction system configured in accordance with an additional embodiment of the present invention.
Figure 11:
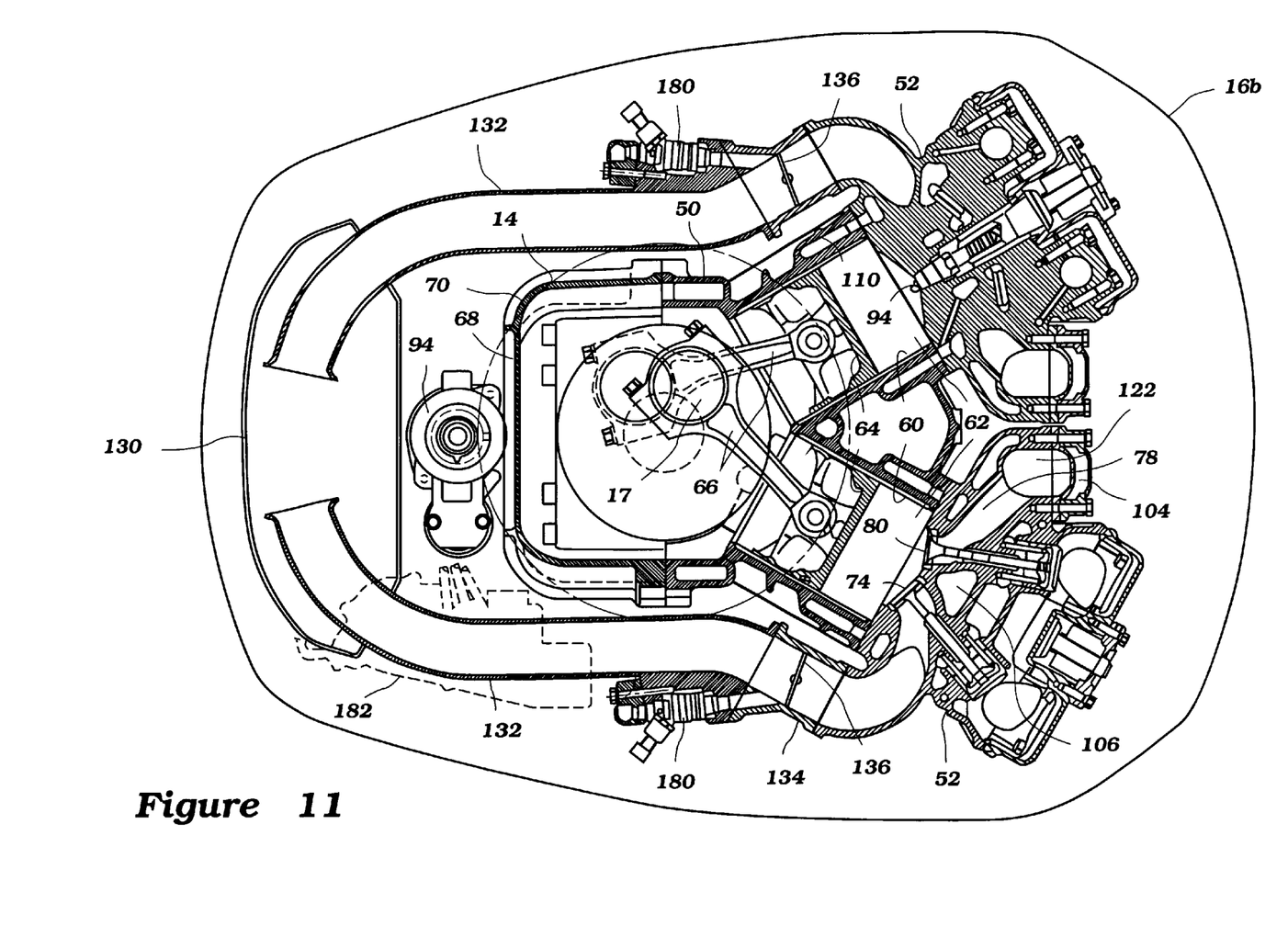
FIG. 11 is a cross-sectional top view of a power head for an outboard motor with an induction system configured in accordance with another embodiment of the present invention.

The throttle bodies 134 of each cylinder bank 56, 58 communicate with an intake manifold 182 of the engine 14. Each throttle body 134 communicates with an intake runner 184 of the intake manifold 182. The fuel injector 180 communicates with the induction system downstream of the throttle valve 136 and upstream of the intake runner 184. The intake runner 184 leads to a primary intake passage 72 formed in the cylinder head 52. The primary passage branches into upper and lower intake passages 72a, 72b, which lead to the combustion chamber 62 through corresponding intake ports. In the illustrated embodiment, each runner 184 extends outwardly from the intake passages of the cylinder head and curves around to communicate with the throttle bodies whose flow axes lie generally parallel to the cylinder axes. In this embodiment, the curvilinear paths of the runners extend away from the engine such that a space exists between the throttle bodies and the engine. In other forms, as illustrated in FIGS. 10 and 11, the curvilinear paths can be tighter such that the throttle bodies lie closer to the engine body.

As illustrated in FIG. 3, the intake runners 184 of the intake manifold 182 slope downwardly from the throttle body 134 to the cylinder head 52. The intake runner 184 corresponding to the bottom cylinder has the greatest degree of slope from an inlet side adjacent the throttle body 134 to an outlet side adjacent the cylinder head 52. The intake runner 184 corresponding to the top cylinder has the least degree of slope.

An air and fuel charge flows through the intake runner 184 to the primary passage 72 in the cylinder head 52. From the primary passage 72, a portion of the charge flows through each of the upper and lower intake passages 72a, 72b.

The upper and lower intake passages 72a, 72b curve toward the combustion chamber 62 and terminate at an acute angle relative to the axis of the cylinder bore, as shown in FIG. 2. This causes the charge to flow generally toward one side of the cylinder 60. The portion of the intake charge entering the combustion chamber from the upper intake passage 72a flows around the cylinder 60 from top to bottom, generating a swirl in the cylinder. The portion of the charge entering from the lower intake passage 72b flows around the cylinder from bottom to top, generating a swirl in the opposite direction. Thus, the swirl generated in the cylinder 60 by the charge entering from the lower intake passage 72b counteracts that generated by the charge entering from the upper intake passage 72a.

Figure 8:
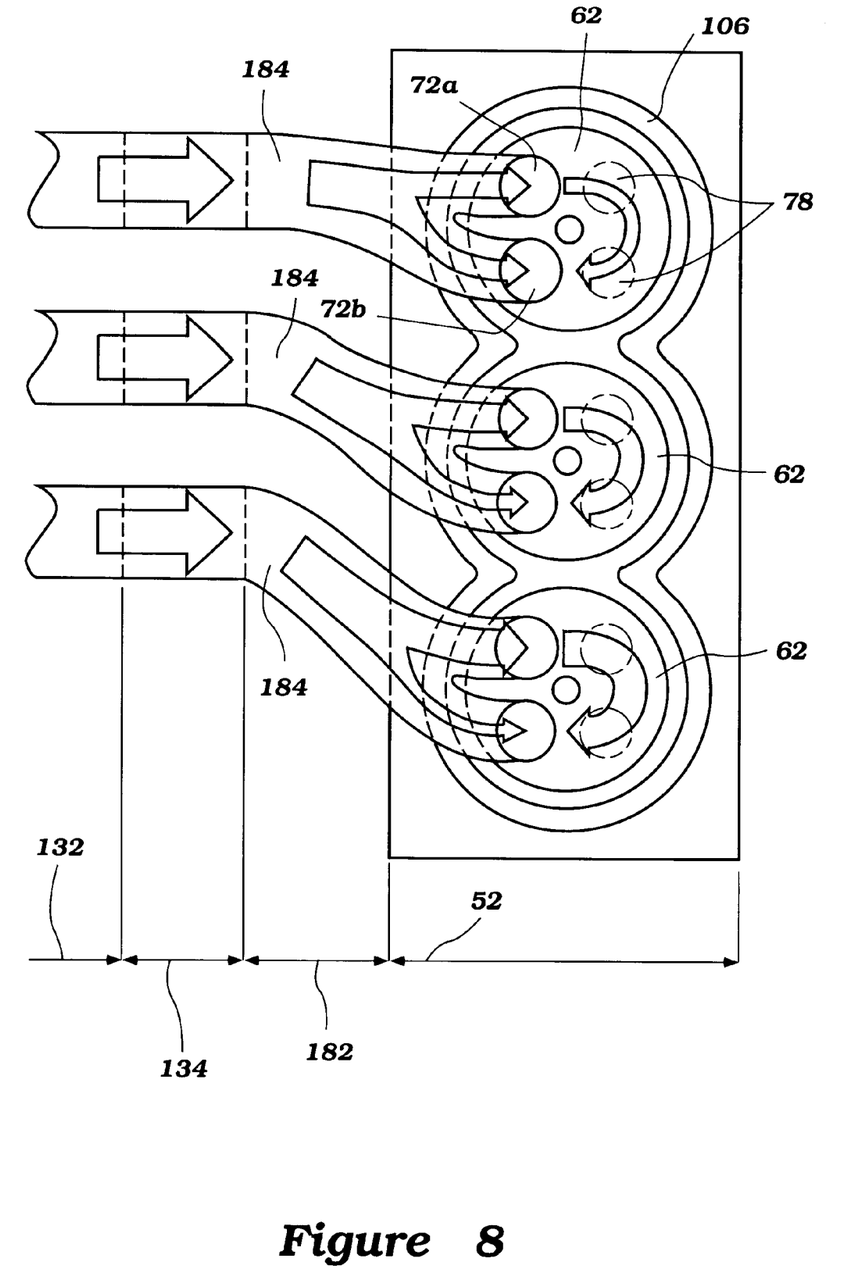
FIG. 8 is a schematic illustration of an induction flow path into the cylinders of one cylinder bank of the engine of FIG. 3 and the internal swirl of the delivered fuel/air charge within each cylinder (the arrow sizes correspond to air flow volumes)

The shape of the intake runner 184 affects the relative portions of the intake charge entering the combustion chamber 62 from the upper and lower intake passages 72a, 72b. As illustrated in FIG. 8, as the slope of the intake runner 184 is increased, the portion of the intake charge entering from the lower intake passage 72b is decreased relative to the portion entering through the upper intake passage 72a. As a result, the amount of swirl generated in the cylinder 60 is increased. On the other hand, as the slope of the intake runner 184 is decreased, the portions of the charge entering through the upper and lower intake passages 72a, 72b become more equal, and the amount of swirl generated in the cylinder 60 is decreased.

As described above, cooling water is circulated from the bottom of the engine 14 to the top of the engine. As a result, the bottom cylinders of the engine are generally cooler than the top. Because fuel from the fuel injectors 180 does not tend to evaporate as quickly at lower temperatures, the combustion efficiency is generally lower in the bottom cylinders. This results in an unbalanced power output between the top and bottom cylinders.

Swirl increases combustion efficiency by ensuring rapid flame propagation and more complete combustion. By generating an increased amount of swirl in the bottom cylinders relative to the top cylinders, some of the power imbalance resulting from the difference in temperature of the cylinders is negated.

Furthermore, as illustrated in FIG. 3, the length of the intake runners 184 corresponding to the bottom cylinders is greater than the length of the intake runners corresponding to the top cylinders. As a result, the length of the path between the fuel injector 180 and the combustion chamber 62 is greater for the bottom cylinders. This allows the fuel more time to evaporate before reaching the combustion chamber, thus increasing combustion efficiency and further providing a more balanced power output between the top and bottom cylinders.

The above-described orientation of the intake pipes 132 and the corresponding runners 184 of the intake manifold 182 provide a space beneath the set of intake pipes. The vapor separator 182 can be located in this space. In addition, the arrangement of the intake pipes and corresponding runners permits the throttle bodies 134 to be positioned closer together in the vertical direction, thereby further compacting the engine.

Figure 9:
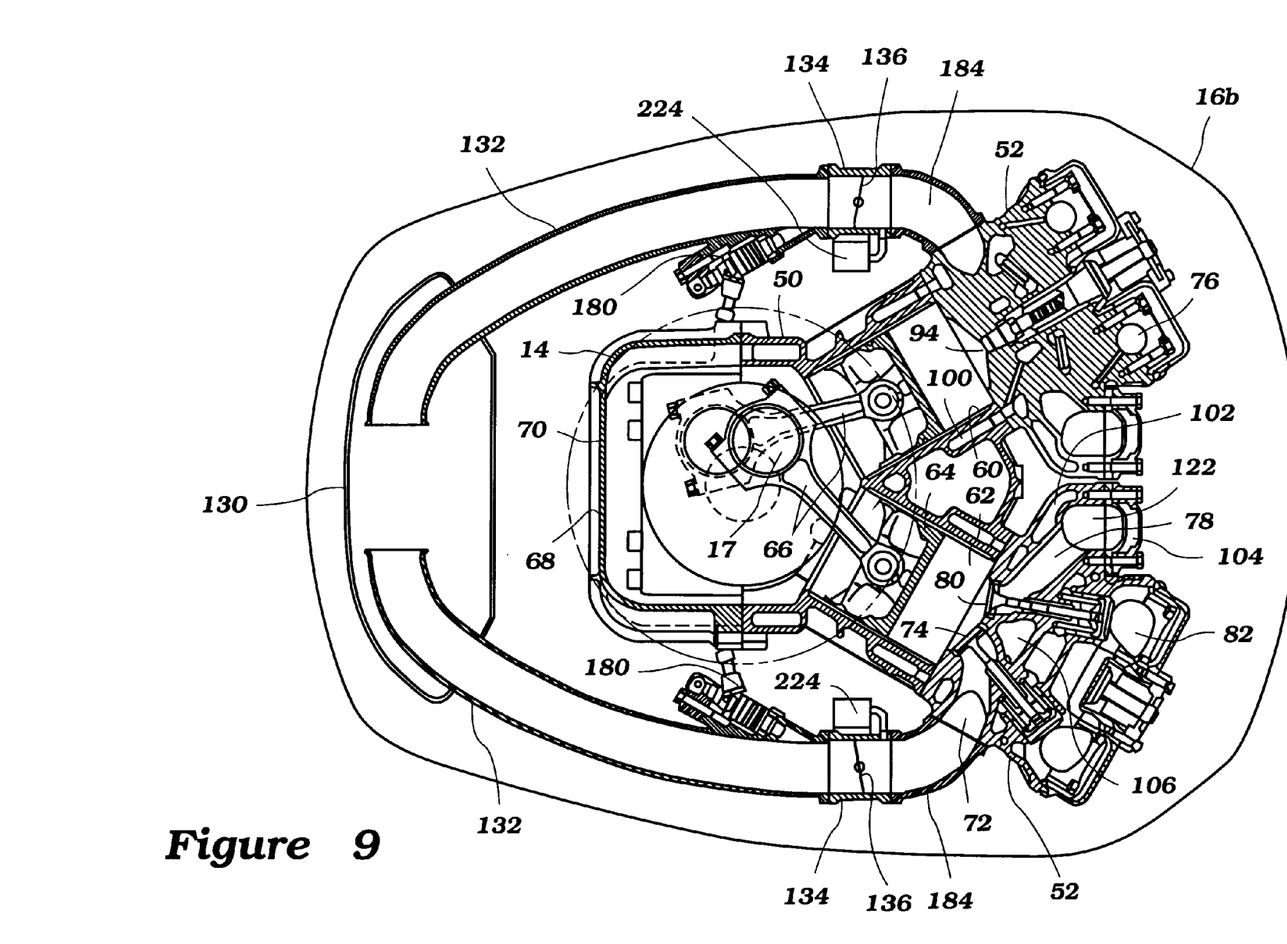
FIG. 9 is a cross-sectional top view of a power head for an outboard motor with an induction system configured in accordance with another embodiment of the present invention.

FIG. 9 illustrates another embodiment of the present invention in which the fuel injector holders are formed integrally with the intake pipes 132 on a side of the intake pipes adjacent the engine body. Unlike the first embodiment, the fuel injectors 180 communicate with the induction system upstream of the throttle valve 136 and the throttle body 134. The spray axis of each fuel injector 180 is generally parallel to an axis of the corresponding cylinder 60, and generally coincides with a direction of airflow through the induction system. That is, the fuel is injected in the direction of the airflow, rather than against it or perpendicular to it. The injector injects fuel toward a gap between an inner surface of the throttle body 134 and the throttle valve 136. Because air flows rapidly through this gap, the injected fuel mixes well with the air. Additionally, the fuel injectors 180 are mounted with their injection ports at a downward orientation. This orientation inhibits fuel collection around the injection port.

FIG. 10 illustrates a third embodiment of the present invention in which the fuel injector holders are formed integrally with the throttle bodies 134, as in the first embodiment, but on a side of the throttle bodies opposite the engine body. In this embodiment, the runners of the intake manifold extend outwardly from the corresponding intake ports and then curve back inwardly toward the engine. The runners communicate with the corresponding intake pipes that extend along a side of the engine and communicates with the air intake chamber.

The fuel injectors 180 communicate with the induction system downstream of the throttle valves 136 and upstream of the intake runners 132. The spray axis of each fuel injector 180 is generally parallel to an axis of the corresponding cylinder 60, and generally coincides with a direction of airflow through the induction system. That is, the fuel injector injection in a direction with the airflow, rather than against it or perpendicular to it. As seen in FIG. 10, the axis of the injector is disposed substantially parallel to an external wall of the crankcase chamber 68. The injector, in this orientation, does not protrude outwardly, and thus the girth of the engine is compact. The protective cowling 16b therefore can also be compact to minimize drag caused by the power head extending above the transom of the associated watercraft. In addition, the location of the fuel injectors on the outer side of the intake pipes eases replacement of the fuel injectors.

FIG. 11 illustrates a fourth embodiment of the present invention in which the fuel injector holders are formed integrally with the intake pipes 132 on a side of the intake pipes opposite the engine body. The intake pipes and intake manifold have substantially the same construction as that described above in connection with the embodiment illustrated in FIG. 10. The fuel injectors 180 communicate with the induction system upstream of the throttle valves 136 and the throttle bodies 134. The spray axis of each fuel injector 180 is generally parallel to an axis of the corresponding cylinder 60, and generally coincides with a direction of airflow through the induction system. That is, the fuel injector injection in a direction with the airflow, rather than against it or perpendicular to it. Like the embodiment illustrated in FIG. 9, the injector injects fuel toward a gap between an inner surface of the throttle body and the throttle valve. Because air flows rapidly through this gap, the injected fuel mixes well with the airflow. Additionally, the fuel injectors are mounted with their injection ports at a downward orientation. This orientation inhibits fuel collection around the injection port.

As common to each of the embodiments described above, the throttle bodies are disposed within each intake passage rather than in the air intake chamber. Thus, even if external air leaks into the intake pipes and/or into the junction between the intake pipes and the air intake chamber, this additional air volume does not affect the amount of air delivered to the corresponding combustion chamber. The present induction system thus does not require the same mounting precision for the intake pipes and air intake chamber (e.g., air silencer) as required by the convention construction. In addition, the intake pipes and the air intake chamber can be pre-assembled and can be mounted onto the engine as one unit.

Additionally, with the fuel injectors mounted onto the throttle bodies or onto the intake pipes, they too can be mounted onto the engine with the intake pipes and intake chamber as one unit. This construction consequently simplifies the engine assembly process, thereby saving assembly time and reducing the number of assembly steps.

Although this invention has been described in terms of a certain preferred embodiment, other embodiments apparent to those of ordinary skill in the art are also within the scope of this invention. Accordingly, the scope of the invention is intended to be defined only by the claims that follow.

What is claimed is:

1. An engine comprising at least one cylinder defining a combustion chamber and an induction system selectively communicating with the combustion chamber to supply a fuel/air charge to the combustion chamber, the induction system including an air intake chamber at an end of the engine opposite the cylinder, a throttle device, a first intake passage extending around a side of the engine between the intake chamber and the throttle device, and a second intake passage extending between the throttle device and the combustion chamber, and a fuel injector communicating with the induction system upstream of the second intake passage.

2. The engine of claim 1, wherein the fuel injector communicates with the induction system at a point downstream of the throttle device.

3. The engine of claim 1, wherein the throttle device regulates flow through a passage of a throttle body, the fuel injector communicates with the induction system at a point upstream of the throttle device, and the fuel injector is oriented to inject toward a gap between a wall of the passage and the throttle device.

4. The engine of claim 1, wherein the fuel injector is disposed between the induction system and the engine.

5. The engine of claim 4, wherein the fuel injector is mounted on a throttle body in which the throttle device operates.

6. The engine of claim 4, wherein the fuel injector is mounted on an intake pipe that defines at least a portion of the first intake passage.

7. The engine of claim 6, wherein the air intake chamber and the intake pipe are made of resin.

8. The engine of claim 1, wherein the fuel injector is disposed on a side of the induction system opposite the engine.

9. The engine of claim 8, wherein the fuel injector is mounted on a throttle body in which the throttle device operates.

10. The engine of claim 8, wherein the fuel injector is mounted on an intake pipe that defines at least a portion of the first intake passage.

11. The engine of claim 10, wherein the air intake chamber and the intake pipe are made of resin.

12. The engine of claim 1, wherein a spray axis of the fuel injector generally corresponds with a direction of airflow through the induction system.

13. The engine of claim 1, wherein the second intake passage extends outwardly from an intake port, through which the second intake passage communicates with the combustion chamber, and then curves back inwardly toward the engine.

14. The engine of claim 1, wherein the second intake passage extends outwardly from an intake port, through which the second intake passage communicates with the combustion chamber, and the first intake passage is curved and extends inwardly along the side of the engine such that the first and second intake passages define an induction path that leads from the air intake chamber, bows outwardly along the side of the engine, and then curves back toward the engine and around to communicate with the intake port.

15. An engine comprising at least one cylinder defining a combustion chamber and an induction system selectively communicating with the combustion chamber to supply a fuel/air charge to the combustion chamber, the induction system including an air intake chamber at an end of the engine opposite the cylinder, a throttle device, a first intake passage extending around a side of the engine between the intake chamber and the throttle device, and a second intake passage extending between the throttle device and the combustion chamber, and a fuel injector mounted upstream of the second intake passage to inject fuel into the induction system.

16. The engine of claim 15, wherein the fuel injector is disposed between the induction system and the engine.

17. The engine of claim 15, wherein the fuel injector is disposed on a side of the induction system opposite the engine.

18. The engine of claim 15, wherein the fuel injector is mounted on the throttle device.

19. The engine of claim 15, wherein the fuel injector is mounted on an intake pipe that defines at least a portion of the first intake passage.

20. The engine of claim 15, wherein a spray axis of the fuel injector generally corresponds with a direction of airflow through the induction system.

21. An engine comprising at least one cylinder defining a combustion chamber and an induction system selectively communicating with the combustion chamber to supply a fuel/air charge to the combustion chamber, the induction system including an air intake chamber at an end of the engine opposite the cylinder, a throttle device, a first intake passage extending around a side of the engine between the intake chamber and the throttle device, and a second intake passage extending between the throttle body and the combustion chamber, the second intake passage having a curvilinear portion transitioning from a direction along the side of the engine to a direction leading into the combustion chamber, and a fuel injector communicating with the induction system upstream of the curvilinear portion of the second intake passage.

22. The engine of claim 21, wherein the fuel injector is disposed between the induction system and the engine.

23. The engine of claim 21, wherein the fuel injector is disposed on a side of the induction system opposite the engine.

24. The engine of claim 21, wherein a spray axis of the fuel injector generally corresponds with a direction of airflow through the induction system.

25. An engine comprising at least one cylinder defining a combustion chamber and an induction system selectively communicating with the combustion chamber to supply a fuel/air charge to the combustion chamber, the induction system including an air intake chamber at an end of the engine opposite the cylinder, a throttle device, a first intake passage extending around a side of the engine between the intake chamber and the throttle device, and a second intake passage extending between the throttle body and the combustion chamber, the second intake passage having a curvilinear portion transitioning from a direction along the side of the engine to a direction leading into the combustion chamber, and a fuel injector mounted upstream of the curvilinear portion for supplying fuel to the induction system.

26. The engine of claim 25, wherein the fuel injector is disposed between the induction system and the engine.

27. The engine of claim 25, wherein the fuel injector is disposed on a side of the induction system opposite the engine.

28. The engine of claim 25, wherein the fuel injector is mounted on the throttle device.

29. The engine of claim 25, wherein the fuel injector is mounted on an intake pipe that defines at least a portion of the first intake passage.

30. The engine of claim 25, wherein a spray axis of the fuel injector generally corresponds with a direction of airflow through the induction system.

31. An engine comprising at least one cylinder defining a combustion chamber and an induction system selectively communicating with the combustion chamber through an intake port to supply a fuel/air charge to the combustion chamber, the induction system including an air intake chamber at an end of the engine opposite the cylinder, a first intake passage extending outwardly from the intake port of the combustion chamber and then curving back inwardly toward the engine, the first intake passage communicating with a second intake passage that extends along a side of the engine and communicates with the air intake chamber, a throttle device disposed between the first and second intake passages, and a fuel injector communicating with the second intake passage and oriented to spray toward the first intake passage.

32. The engine of claim 31, wherein the fuel injector is mounted to a throttle body in which the throttle device operates.

33. The engine of claim 31, wherein the fuel injector is mounted to an intake pipe that defines at least a portion of the second intake passage.

34. The engine of claim 31, wherein the fuel injector is disposed between the second intake passage and the engine.

35. An engine comprising at least one cylinder defining a combustion chamber and an induction system selectively communicating with the combustion chamber through an intake port to supply a fuel/air charge to the combustion chamber, the induction system including an air intake chamber at an end of the engine opposite the cylinder, a first intake passage extending outwardly from the intake port of the combustion chamber and communicating with a second intake passage, the second intake passage being curved and inwardly extending along a side of the engine and communicating with the air intake chamber, a throttle device disposed between the first and second intake passages, and a fuel injector communicating with the second intake passage and oriented to spray toward the first intake passage.

36. The engine of claim 35, wherein the first and second intake passages define an induction path that leads from the air intake chamber, bows outwardly along the side of the engine, and then curves back toward the engine and around to communicate with the intake port.

37. The engine of claim 36, wherein the fuel injector is mounted to a throttle body in which the throttle device operates.

38. The engine of claim 36, wherein the fuel injector is mounted to an intake pipe that defines at least a portion of the second intake passage.

39. The engine of claim 38, wherein the fuel injector is disposed between the second intake passage and the engine.

40. An engine comprising at least first and second combustion chambers, the first combustion chamber being arranged above the second combustion chamber, and an induction system selectively communicating with the combustion chambers to supply a fuel/air charge thereto, the induction system including a first intake passage leading to the first combustion chamber and having a first fuel injector communicating therewith and a second intake passage leading to the second combustion chamber and having a second fuel injector communicating therewith, a length of the second intake passage from the second fuel injector to second combustion chamber being greater than a length of the first intake passage from the first fuel injector to the first combustion chamber.

41. The engine of claim 40, wherein the second intake passage descends from the second fuel injector toward the second combustion chamber by a greater degree than the first intake passage.

42. The engine of claim 41, wherein each intake passage communicates with the corresponding combustion chamber through at least two intake ports.

43. The engine of claim 40, wherein the engine further includes means for generating a differential in an amount of swirl of the fuel/air charge between the first and second combustion chambers.

44. The engine of claim 43, wherein said means produces a greater swirl of the fuel/air charge in the second combustion chamber than the swirl produced in the first combustion chamber.

45. An engine comprising at least first and second combustion chambers, the first combustion chamber being arranged above the second combustion chamber, and an induction system selectively communicating with the combustion chambers to supply a fuel/air charge thereto, the induction system including a first intake passage leading to the first combustion chamber and having a first fuel injector communicating therewith and a second intake passage leading to the second combustion chamber and having a second fuel injector communicating therewith, the second intake passage descending from the second fuel injector toward the second combustion chamber by a greater degree than the first intake passage descends from the first fuel injector toward the first combustion chamber.

46. The engine of claim 45, wherein each intake passage communicates with the corresponding combustion chamber through at least two intake ports.

47. The engine of claim 45 additionally comprising at least two throttle devices, each throttle device regulating air flow through a corresponding of the first and second intake passages.

48. The engine of claim 47, wherein the fuel injector is mounted to a throttle body in which the throttle device operates.

49. The engine of claim 4, wherein a spray axis of the fuel injector is generally parallel to a longitudinal axis of the cylinder.

50. The engine of claim 8, further comprising a crankcase defined at least in part by a side wall, wherein a spray axis of the fuel injector is generally parallel to the side wall of the crankcase.

* * * * *

UNITED STATES PATENT AND TRADEMARK OFFICE
CERTIFICATE OF CORRECTION

PATENT NO.    : 6,321,720 B1
DATED         : November 27, 2001
INVENTOR(S)   : Yukinori Kashima It is certified that error appears in the above-identified patent and that said Letters Patent is hereby corrected as shown below:

<u>Column 14,</u>
Line 35, please insert -- one -- after "corresponding"

Signed and Sealed this

Seventeenth Day of June, 2003

JAMES E. ROGAN
*Director of the United States Patent and Trademark Office*